United States Patent [19]
Cannady, Jr.

[11] 3,948,713
[45] Apr. 6, 1976

[54] PROCESS FOR EMBOSSING HIGH PRESSURE DECORATIVE LAMINATES

[75] Inventor: Daniel L. Cannady, Jr., Allendale, S.C.

[73] Assignee: Westinghouse Electric Corporation, Pittsburgh, Pa.

[22] Filed: Dec. 12, 1973

[21] Appl. No.: 423,952

[52] U.S. Cl. ............... 156/220; 156/222; 428/165
[51] Int. Cl.² ..................... B44C 1/24; B44C 3/08
[58] Field of Search .......... 156/209, 219, 220, 222; 161/119, 125; 428/165

[56] References Cited
UNITED STATES PATENTS

| | | | |
|---|---|---|---|
| 3,308,227 | 3/1967 | Power et al. | 156/220 |
| 3,311,520 | 3/1967 | Michaelson et al. | 156/209 |
| 3,532,587 | 10/1970 | Ungar et al. | 156/209 |
| 3,589,961 | 6/1971 | Fordyce et al. | 156/220 |
| 3,661,672 | 5/1972 | McQuade, Jr. | 156/220 |
| 3,674,619 | 7/1972 | Scher et al. | 156/219 |
| 3,761,338 | 9/1973 | Ungar et al. | 156/220 |

Primary Examiner—William A. Powell
Assistant Examiner—Basil J. Lewris
Attorney, Agent, or Firm—D. P. Cillo

[57] ABSTRACT

An embossing assembly, for use in making high pressure decorative laminates, contains at least one metal sheet 0.0003–0.05 inch thick, having a patterned embossing side and a support side, the support side having indentations therein which form the pattern on the embossing side, and an accompanying fibrous support having a thickness of from about 0.5–7 times the deepness of the indentations per metal sheet, disposed next to the support side of the metal sheet.

5 Claims, 1 Drawing Figure

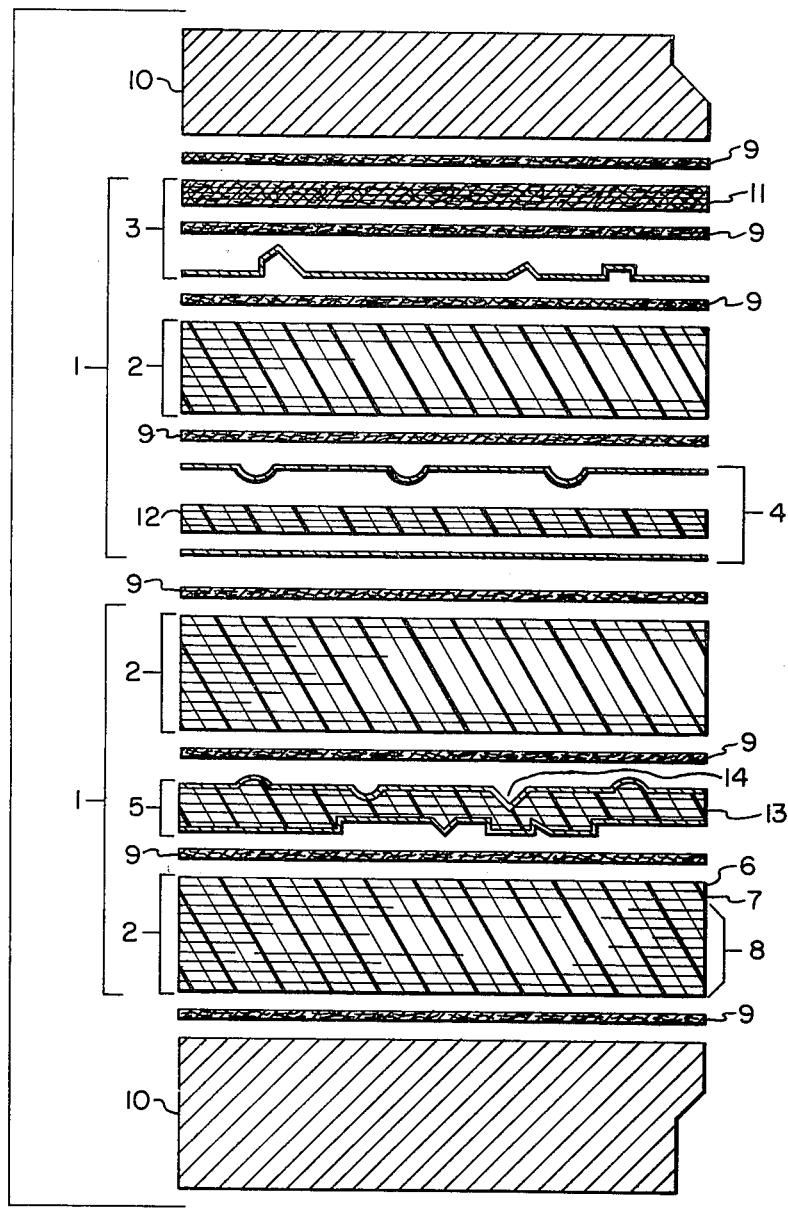

PROCESS FOR EMBOSSING HIGH PRESSURE DECORATIVE LAMINATES

BACKGROUND OF THE INVENTION

Decorative laminates are well-known articles of commerce which have been produced for many years, and find utility in embossed table tops and patterned wall surfaces among many other uses.

Specialty texturing finishes are the current trend in the high pressure laminating industry. To make such finishes economically; thin, strong embossing sheets are required. Generally, aluminum sheet, with an embossing surface has been used to transfer a like pattern to the surface of a high pressure decorative laminate. These embossed sheets, when used in a standard laminate assembly of embossing sheet, overlay sheet, print sheet, and core sheets, must be about 80 mils thick (0.08 inch), to impress a pattern without flattening under pressure. The laminate is generally about 80 mils thick. As can be seen, the thick embossing sheet can take up to 50% of the room in a laminate assembly.

This problem was partly solved by the embossing sheets described in U.S. Pat. No. 3,648,358, which constituted 0.3 to 4 mil aluminum foil having an embossed, pattern side which was used against the overlay and print sheets, and a resin filled flat back side support surface which was used against the press plate. This embossing sheet, while taking up minimal room in a laminate assembly and being able to resist flattening under pressure, required use of a resin casting operation to fill the foil support surface. Preferably, the method also required degreasing and roughing operations, to improve resin-foil bonding, all of which added substantially to process cost. As can be seen, there is a need for a method of making embossed decorative laminates using an assembly contining thin, patterned embossing sheets that are inexpensively supported against flattening under pressure.

SUMMARY OF THE INVENTION

The above need is met by providing an embossing assembly comprising at least one and preferably two embossed metal sheets with an accompanying fibrous support layer, preferably resin impregnated. The preferred support layer comprises epoxy or phenolic resin impregnated glass cloth or paper disposed between two embossed metal sheets. This embossing assembly is used in a laminating assembly comprising in superimposed relationship, core sheets, print sheet, overlay sheet, release sheet, embossing assembly, release sheet, overlay sheet, print sheet and core sheets. The entire laminating assembly or a plurality of laminating assemblies are heat and pressure consolidated and then the embossing assemblies removed, to provide embossed decorative laminates. The embossed metal sheets can then be reused, because the support layer in the embossing assembly provides the strength to resist deformation.

BRIEF DESCRIPTION OF THE DRAWING

For a better understanding of the invention, reference may be made to the preferred embodiments, exemplary of the invention, shown in the accompanying drawing in which the FIGURE shows the embossing assemblies of this invention in high pressure laminating assemblies in accordance with this invention.

DESCRIPTION OF THE PREFERRED EMBODIMENTS

Referring now to the drawing, a plurality of laminating assemblies are shown between press surfaces. In the method of this invention, for embossing high pressure decorative laminates, at least one embossing assembly comprising, preferably two embossed metal sheets with a fibrous support layer disposed therebetween is used in the laminating assembly.

The drawing shows a plurality of laminating assemblies 1. Each laminating assembly comprises laminate lay up 2 and embossing assembly 3, 4 or 5. The laminate lay up 2 generally comprises an overlay sheet 6, which faces the embossing assembly, a print sheet 7 and core sheets 8. Generally, release sheets 9 are used between the press surfaces 10 and the laminate assembly 1 and between the laminate lay up 2 and the embossing assemblies 3, 4 or 5. In the method of this invention, heat and pressure are applied to this configuration of laminate lay ups and embossing assemblies to consolidate the laminate lay ups to a unitary embossed decorative structure, after which the embossing assemblies are removed.

The embossing assembly used in the method of this invention comprises at least one metal sheet having an imprinted, embossed surface formed by indentations on the opposite support side, with an accompanying fibrous support layer. Such a configuration is shown as the top embossing assembly 3 in the drawing with the patterned embossing side of the assembly facing the laminate lay up 2. A supporting layer 11 must, however, be disposed between the press surface and the embossed metal sheet when the embossing assembly is next to the press surface in the laminating assembly.

Preferred embossing assemblies used in the method of this invention, shown as 4 and 5 in the drawing, comprise at least one and preferably two embossed metal sheets having a fibrous support layer, such as 12 or 13 sandwiched therebetween. The embossing assemblies may comprise a loose support layer, shown as 11 or preferably, a resin impregnated support layer, shown as 12 or 13. The support layer may be bonded to the embossed metal sheets as in the preferred embossing assembly 5 or loose, alone as in the embossing assembly 4 or loose along with a release sheet between the embossed metal sheet and support as in the embossing assembly 3. Indentation 14 in the metal sheet is shown pressing deeply into the fibrous support 13 which is disposed next to the indentations in the support side of the metal sheet. Indentation 14 into the support is shown opposite a protrusion out from the support presenting a matched configuration where very thin supports could be used.

The support layer can be selected from sheets of fibrous material such as kraft paper, alpha cellulose paper, regenerated cellulose paper synthethic fiber paper, cotton, linen and glass fiber cloth or glass fiber roving. The sheets making up the support layer will generally range in thickness from about 0.001–0.02 inch, and preferably between about 0.003–0.01 inch. Under 0.001 inches and the sheets are expensive and difficult to handle, over 0.02 inch and the sheets are too coarse and not desirable for this process. The fibrous paper support sheets are preferred and should have between about 30–150 lb. basis weight, i.e. about 30–150 lb. of paper per 3000 sq. ft. of sheet to provide sufficient bulk. The support layer must be effective to provide enough bulk and thickness to support and cushion against flattening of the indentations in the embossed metal foil under laminating pressure. The support layer must also be thick enough to tolerate the heat input during the laminating process. Generally the support layer will be between about 0.01–0.15 inch thick.

The support layer thickness will be about 0.5–7 times but preferably 1–4 times the depth of the deepest indentation into the support per embossing sheet i.e. if one metal embossing sheet having uniform 0.02 inch deep pattern indentations is used, the support layer should be between about 0.01–0.14 inch thick; if the support is disposed between two such metal embossing sheets, the support layer should be between about 0.02–0.28 inch thick. Below about a 1:0.5 ratio, the deepest metal foil indentations into the support layer will generally flatten in a press at high laminating pressures even if they are offset or matched to protrusions out from the support on the second metal foil sheet making up the embossing assembly. Above about a 1:7 ratio of the total of the deepest indentation depth into the support layer: support layer thickness, the embossing assembly begins to take up too much space in the laminating assembly. Generally, most of the indentations will be about the same depth into the support layer.

The support layer may comprise loose sheets or preferably the sheets can be impregnated with a resin such as phenolic or epoxy resin, preferably a Bisphenol A-type epoxy (polyglycidyl ether). The resin may also contain up to about 50 wt %, but preferably between about 5–35 wt %, small filler particles such as fine sand or metal particles or filings such as steel or aluminum, having an average particle size range of between about 149–37 microns (100–400 mesh), to help support the metal foil, and in the latter case improve heat transfer during laminating.

The metal foil used in the embossing assembly will have a thickness of between about 0.0003–0.05 inch but preferably between about 0.0005–0.035 inch. Below 0.0003 inch, the type support described above proves inadequate to cushion the embossed surface against flattening under pressure. Above 0.05 inch the embossing assembly begins to take up too much space in the laminating assembly. The metal foil can be copper, tin, or steel but is preferably aluminum. The metal foil may be unlocked, but in very thin sizes it is generally provided with a kraft or litho paper or other type backing. The metal foil surface may have a coating of release agent, as for example, stearic acid, zinc stearate or calcium stearate on the embossing surface which is positioned against the laminate lay up. This coating could eliminate the need of glassine or other type release sheets generally used between the laminate lay up and the embossing assembly. The coating could also be used on the support side surface of those embossing assemblies where a releasable assembly is desired, as in assembly 3 of the drawings. The embossing foil, which will have a pattern on the embossing side and indentations which will press into the support, can be made by any suitable technique such as molding or passing the foil between a patterned steel embossing cylinder and a rubber roller as described in U.S. Pat. Nos. 3,648,358.

The overlay sheet is a thin sheet of high grade paper which has been impregnated with a thermosetting resin, such as a melamine formaldehyde resin or other triazine resins, ureaformaldehyde resins, thiourea-formaldehyde resins, unsaturated polyester resins and the like. In selecting the resin for the overlay sheet, it is generally preferred to utilize the same resin or substantially the same quality of resin which has been used to impregnate the print sheet. The overlay sheet is not a necessary part of the laminating assembly although it is generally used.

The print sheet usually provides the decorative effect for the laminate. It is usually in the form of a decorative sheet, i.e. dyed, pigmented to impart a solid color or printed with an ornamental design, such as wood or marble grain. It usually comprises a single sheet of high grade absorbent alpha cellulose or regenerated cellulose paper impregnated with a substantially completely cured aminotriazinealdehyde resin, usually a thermoset melamine-formaldehyde resin. Other useful print sheet materials are kraft paper, synthetic fiber paper, cotton, linen, glass fiber fabric and the like.

In cases where fidelity is important, the imprint caused by the embossing assembly of this invention will match the design on the print sheet by positioning the embossing assembly in the laminating assembly to substantially register its protrusions with the desired indentations on the print sheet. For example, if the print sheet has a knotted wood grained pattern, the embossing assembly protrusions must match this pattern, so that the finished laminate texturing will match the wood grain.

The rigidity-imparting core stock layer usually comprises a plurality of sheets of kraft paper impregnated with phenolic resin.

The aminotriazine-aldehyde resins used to impregnate the overlay and print sheets are well known in the art and reference may be made to U.S. Pat. No. 3,392,092 for exhaustive details on their production. Similarly, complete details on the phenolic resins used to impregnate the core sheet can be found in U.S. Pat. Nos. 2,205,427; 2,315,087; 2,328,592 and 2,383,430.

The overlay sheet, print sheet and core sheets are impregnated using standard techniques. The print sheet will be impregnated with a solution of aminotriazine-aldehyde resin to give a resin content between 30 and 75 percent by weight, based on the total dry weight of the impregnated sheet and then dried to a stage where the volatile content is between 2 and 10 percent. The core layer sheets are impregnated with a solution of phenolic resin to give a resin content between 20 and 40 percent by weight, based on the total dry weight of the impregnated sheet, and then dried to a stage at which the resin is only partly cured and has a volatile content between 4 and 15 percent.

High pressure laminating techniques are employed in preparing the laminates from the above described assembly of core stock layer of core sheets, print sheet and overlay sheet.

Temperatures ranging from about 120° C to about 175° C and pressures ranging from about 600 to 2,000 p.s.i. are employed. The time required, at these temperatures, to effect a cure of the resinous components of the assembly will usually be from about 3 minutes to about 25 minutes. The resulting laminate is generally allowed to cool to between about 50°–85° C before being removed from the press. The cooling step generally takes between about 30–90 minutes. Generally, the assembly will require a 15–45 minute warm up period before the 120°–175° C maximum curing temperatures are reached in the press. The entire cycle of warm up, cure and cooling will vary between about 50–160 minutes.

EXAMPLE 1

A build up of a laminating assembly was prepared as described below: A roll of 115-lb. basis weight kraft paper, 0.01 inch thick, was treated with a solution of phenolformaldehyde resin, to give a resin content of between about 30 and 40 weight percent, and then dried to a stage at which the resin was only partly cured and had a volatile content of between about 6 and 9 weight percent. Equal size partly cured impregnated core sheets, 12 inches × 18 inches were cut from the roll and assembled in stacks of seven sheets to form core stock layers.

A release sheet was placed on the bottom plate press surface followed by a core stock layer. A pigmented, resin impregnated, cured print sheet was placed on the core stock layer followed by a clear, resin impregnated cured overlay sheet. The print and overlay comprised 12 inches × 18 inches sheets of alpha cellulose paper impregnated with melamine-formaldehyde resin. The melamine-formaldehyde resin content of the print and overlay sheets prior to drying was between about 35 and 45 weight percent, and after curing they had a volatile content of between about 3.5 and 5 weight percent. A release sheet was then superimposed on the overlay sheet.

An embossing assembly was then placed on top of the release sheet and the laminate lay up consisting of overlay sheet, print sheet and core stock layer.

A release sheet was then placed on top of the embossing assembly, followed by an overlay sheet, print sheet, core stock layer and top release sheet to provide a laminating assembly. This laminating assembly was similar in structure to the lower laminating assembly 1 shown in the drawing.

The embossing assembly consisted of two sheets of 0.03 inch thick aluminum, having an embossed pattern of uniform protrusions and indentations about 0.02 inch deep with a support layer therebetween. The support layer consisted of 7 sheets of 0.01 inch thick 115 lb. basis weight kraft paper impregnated with a diglycidyl ether of Bisphenol A epoxy resin. The indentations in the aluminum sheets pressed into the support. The support layer was 1.75 times the depth of the deepest indentation per sheet i.e. (0.07/0.02 + 0.02).

The press was then closed against the laminating assembly which was molded at 1000 psi and about 155° C. The assembly was heated in the press for a total of about 35 minutes. i.e. about 20 minutes was required for warm-up after placing the laminating assembly in the press and 15 minutes was required at the maximum internal temperature. Then the assembly was allowed to cool for about 45 minutes until the assembly reached a temperature of 70°–80° C, after which the laminating assembly was taken from the press and the laminate lay ups separated from the embossing assembly.

Two clearly textured, consolidated, strongly bonded decorative laminates were produced. The embossing assembly was also strongly bonded together into a unitary structure and the protrusions and indentations in the top and bottom aluminum sheets were not flattened. This embossing assembly was used several times in other laminating assemblies at similar pressures and temperatures with little loss of sharpness of the pattern in the top and bottom aluminum sheets and without delamination of the embossing assembly. In the same fashion, 5 sheets of 0.0085 inch thick fiber glass cloth, Style 1581 weighing 8.9 oz./sq yd, were substituted for the impregnated kraft paper with similar excellent results.

The melamine formaldehyde and phenol formaldehyde impregnating resins used above to impregnate the overlay, print and core stock papers were prepared as follows:

To 1,620 lb. (20 moles) of a 37 percent formaldehyde solution with a pH adjusted to about 7.5 with sodium hydroxide was added 1,260 lb. (10 moles) of recrystallized melamine. The mixture was heated to reflux and then cooled to 60°–65° C. Then the following materials were added in order: 200 lb. of ethyl alcohol, 140 lb. of o.p-toluene sulfonamide and 186 lb. of methylglucoside. Mixing was continued to complete solution. Finally 734 lbs. of water was added.

To 940 lb. (10 moles) of molten phenol was added 1,012 lb. (12.5 moles) of 37 percent formaldehyde solution. To this was added a sodium hydroxide solution containing 15 lb. was added a sodium hydroxide solution containing 15 lb. (0.375 mole) of sodium hydroxide flakes dissolved in 30 lb. of water. The mixture was reacted at 98° C. reflux and then diluted with methyl alcohol.

EXAMPLE 2

A build up of a laminating assembly was prepared and placed in a press as in EXAMPLE 1 using the same construction and materials, except the embossing assembly consisted of two sheets of 0.035 inch thick aluminum, having an embossed straight line series of protrusions and indentations about 0.025 inch deep with a support layer therebetween. The support layer consisted of 7 sheets of unimpregnated 0.01 inch thick 115 lb. basis weight kraft paper. The 0.025 inch indentations in the aluminum sheets pressed into the support. The support layer thickness was 1.4 times the depth of the deepest indentation per embossed metal sheet i.e. (0.07/0.025 + 0.025).

The press was then closed against the laminating assembly which was molded at 1000 psi and about 155° C. The assembly was heated in the press for a total of about 35 minutes. About 20 minutes was required for warm-up after placing the laminating assembly in the press and 15 minutes was required at the maximum internal temperature. Then the assembly was allowed to cool for about 45 minutes until the assembly reached a temperature of 70°–80° C, after which the laminating assembly was taken from the press and the laminate lay ups separated from the embossing assembly.

Two clearly textured, consolidated, strongly bonded decorative laminates were produced. The embossing assembly was not bonded together. The protrusions and indentations in the top and bottom aluminum sheets were not flattened. The metal sheets were then separated from the kraft paper support. The support showed a cushioning pattern impressed by the metal sheets.

EXAMPLE 3

A build up of a laminating assembly was prepared and placed in a press as in EXAMPLE 1 using the same construction and materials except the embossing assembly consisted of two sheets of 0.035 inch thick aluminum, having an embossed straight line series of protrusions and indentations about 0.025 inch deep with a support layer therebetween. The support layer consisted of two 0.01 inch thick glassine release sheets, with 7 sheets of phenolic resin impregnated 0.01 inch thick 115 lb. basis weight kraft paper disposed therebetween.

The press was then closed against the laminating assembly which was molded at 1000 psi and about 155° C. The assembly was heated in the press for a total of about 35 minutes. About 20 minutes was required for warm-up after placing the laminating assembly in the press and 15 minutes was required at the maximum internal temperature. Then the assembly was allowed to cool for about 45 minutes until the assembly reached a temperature of 70°–80° C, after which the laminating assembly was taken from the press and the laminate lay ups separated from the embossing assembly.

Two clearly textured, consolidated, strongly bonded decorative laminates were produced. The embossing assembly was not bonded together. The protrusions and indentations in the top and bottom aluminum sheets were not flattened. The metal sheets were then separated from the glassing kraft paper support which showed a cushioning pattern impressed by the metal sheets.

EXAMPLE 4

Two build ups of a laminating assembly were prepared and placed in a press as in EXAMPLE 1, using the same construction and materials, except one embossing assembly consisted of two sheets of 0.0005 inch copper foil, having an embossed straight line pattern of protrusions and indentations about 0.0025 inch deep with a support layer therebetween. The support layer consisted of 2 sheets of 0.005 inch thick 105 lb. basis weight alpha cellulose paper impregnataed with a diglycidyl ether of Bisphenol A epoxy resin (sold commercially under the tradename Epon 828 by Shell Chemical Co.). The other embossing assembly consisted of two sheets of 0.004 inch copper foil, having an embossed slate stone pattern of protrusions and indentatons about 0.015 inch deep with a support layer therebetween. The support layer consisted of 16 sheets of 0.004 inch thick 40 lb. basis weight alpha-cellulose paper impregnated with a diglycidyl ether of Bisphenol A epoxy resin.

The press was then closed against each of the laminating assemblies which were molded at 1000 psi and about 155° C. Each assembly was heated in the press for a total of about 35 minutes. About 20 minutes was required for warm-up after placing the laminating assembly in the press and 15 minutes was required at the maximum intenal temperature. Then the assemblies were allowed to cool for about 45 minutes until the assemblies reached a temperature of 70° –80° C, after which the laminating assemblies were taken from the press and the laminate lay ups separated from the embossing assemblies.

Clearly textured, consolidated, strongly bonded decorative laminates were produced. The embossing assemblies were bonded together. The protrusions and indentations in the top and bottom copper sheets were not flattened.

The combination of two plates, about 0.025 inch thick, by any of the methods shown in the examples, allows accommodation of at least two embossed sheets in less space than would have been required for one of the ⅛ inch (0.12 inch) thick standard aluminum embossing sheets, making the difference between economical and an uneconomical laminating operation from a productivity standpoint. The embossing assemblies of this invention are also reuseable, ultra thin, and very inexpensive.

I claim:

1. A method for producing a laminate with an embossed surface comprising the steps:
   a. preparing at least one laminating assembly containing at least two laminate lay ups with an embossing assembly disposed therebetween, wherein the laminate lay ups comprise in superimposed relationship an aminotriazinealdehyde impregnated print sheet and a plurality of thermosetting phenolic resin impregnated core sheets; the embossing assembly comprises two embossed metal sheets, each metal sheet having a patterned embossing side and a support side, the support side having indentations therein which form a pattern on the embossing side, and an accompanying unimpregnated fibrous support layer of a plurality of sheets, each sheet having a thickness of between about 0.001–0.02 inch, said support layer having a thickness of from 0.5–7 times the depth of the deepest indentation per embossed metal sheet, said support layer disposed between the support sides of the embossed metal sheets; wherein the embossing assembly is disposed next to the print sheets of the laminate lay ups,
   b. heat and pressure consolidating the laminate lay ups to a unitary structure, and removing the embossing assembly.

2. The method of claim 1 wherein the laminate lay ups are consolidated at a temperature between about 120°–175° C a pressure between about 600 to 2000 psi.

3. The method of claim 2 wherein the support layer is a fibrous material selected from the group consisting of kraft paper, alpha cellulose paper, regenerated cellulose paper, synthethic fiber paper, cotton, linen and glass cloth, and the embossed metal sheets have an outer coating of release agent.

4. A method for producing a laminate with an embossed surface comprising the steps:
   a. preparing at least one laminating assembly containing at least two laminate lay ups with an embossing assembly disposed therebetween, wherein the laminate lay ups comprise in superimposed relationship an aminotriazinealdehyde impregnated print sheet and a plurality of themosetting phenolic resin impregnated core sheets; the embossing assembly comprises two embossed metal sheets 0.0003–0.05 inch thick, each metal sheet having a patterned embossing side and a support side, the support side having indentations therein which form a pattern on the embossing side, and an accompanying fibrous support layer impregnated with a resin selected from the group consisting of epoxy and phenolic resins, said support layer having a thickness of from 0.5–7 times the depth of the deepest indentation per embossed metal sheet, said support layer disposed between the support sides of the embossed metal sheets; wherein the embossing assembly is disposed next to the print sheets of the laminate lay ups,
   b. heat and pressure consolidating the assembly at between about 120° C–175° C and 600 to 2000 psi to a unitary structure, and removing the embossing assembly.

5. The method of claim 4 wherein the support layer is impregnated with a resin containing from about 5–50 wt% filler particles having an average particle size from about 149–37 microns.

* * * * *